United States Patent
Khoury (12)

(10) Patent No.: US 6,400,841 B1
(45) Date of Patent: Jun. 4, 2002

(54) METHOD FOR EVALUATING THREE-DIMENSIONAL RENDERING SYSTEMS

(75) Inventor: Issa Y. Khoury, Scottsdale, AZ (US)

(73) Assignee: General Electric Company, Waukesha, WI (US)

( * ) Notice: Subject to any disclaimer, the term of this patent is extended or adjusted under 35 U.S.C. 154(b) by 0 days.

(21) Appl. No.: 09/248,548

(22) Filed: Feb. 11, 1999

(51) Int. Cl.⁷ .............................. G06K 9/00; G06K 9/68; G06T 15/00
(52) U.S. Cl. ..................... 382/154; 382/218; 345/419
(58) Field of Search ................................ 382/154, 128, 382/131, 132, 218, 219, 220; 345/419, 424

(56) References Cited

U.S. PATENT DOCUMENTS

| | | | |
|---|---|---|---|
| 5,986,662 A | * | 11/1999 | Argiro et al. ............... 345/424 |
| 6,072,497 A | * | 6/2000 | Lichtenbelt et al. ........ 345/424 |
| 6,072,498 A | * | 6/2000 | Brittain et al. .............. 345/428 |
| 6,091,422 A | * | 7/2000 | Quaknine et al. ........... 345/419 |
| 6,222,937 B1 | * | 4/2001 | Cohen et al. ................ 382/154 |

OTHER PUBLICATIONS

Rusinek et al, Quantitative and Qualitative Comparison of Volumetric and Surface Rendering Techniques, Apr. 1991, IEEE ISBN: 0018–9499, vol. 38, Issue 2, pp. 659–662.*

* cited by examiner

*Primary Examiner*—Amelia M. Au
*Assistant Examiner*—Mehrdad Dastouri
(74) *Attorney, Agent, or Firm*—Quarles & Brady LLP

(57) ABSTRACT

A method of automatically evaluating settings for three dimensional rendering engines establishes a mathematical equivalency to image quality such as may be RMS error. With this mathematical index, a gold standard setting may be established and used to compare clinical images with other settings. The image qualities for different settings may be fit to a functional model so as to provide rapid assessment of the affect on image quality of parameter adjustments. The time-cost for producing the image may also be fit to a surface to allow more complex time/image quality trade offs to be realized.

11 Claims, 3 Drawing Sheets

METHOD FOR EVALUATING THREE-DIMENSIONAL RENDERING SYSTEMS

BACKGROUND OF THE INVENTION

In medical imaging, such as computed x-ray tomography, magnetic resonance imaging, ultrasound imaging or nuclear medicine, data may be acquired over a three-dimensional volume. The data may be projected to one or more two-dimensional images for viewing by a physician by using a rendering engine. The rendering engine uses a rendering algorithm, such as ray tracing, which accepts the three-dimensional data and various operation settings, such as sampling resolution, windowing, and the like, to produce the two-dimensional images.

Often a number of two-dimensional projections must be produced on a very rapid basis to provide cinematographic-type image rotation such as assists the physician's understanding of the three-dimensional structure. Accordingly, it is desirable that the selection of the rendering algorithm and its operating settings be adjusted so as to provide the very best image in the shortest possible processing time. Generally, the operation settings will significantly affect imaging speed. Different rendering engines may also provide better rendering for particular types of data.

For this reason, it is desirable to evaluate particular rendering algorithms and their operation settings. Currently, such evaluation is done by subjectively evaluating clinical images by human operators while operation settings are adjusted on essentially a trial and error basis. This practice is slow, expensive and error prone.

BRIEF SUMMARY OF THE INVENTION

The present invention quantifies the previously subjective evaluation of images and thereby allows automated evaluation of rendering systems and operation parameters. This quantitative technique first identifies a "gold standard" of parameter settings using a simplified synthetic three-dimensional data set that yields an unambiguous optimal value. Total image energy may be used to quantify the image quality. The "gold standard" set of parameters is then applied to actual clinical data to produce a "gold standard image" which may be compared to different images of the same data using different parameters. The comparison may be made using a simple mathematical measure such as root mean square (RMS) error. A function may be fit to the data points of the different parameters and the image energy using regression or other techniques such as the statistical technique "Design of Experiment" so as to provide a quick means of evaluating trade offs between imaging parameters.

Specifically, the method provides a method of evaluating three-dimensional rendering systems with actual clinical data. The method includes the steps of collecting three-dimensional image data and identifying a set of parameters (being either or both of the rendering algorithm and the operation parameters) affecting an image quality of the two-dimensional images produced by the rendering system. A set of two-dimensional images are generated using the rendering system operating on the three-dimensional image data using different parameters of the set of parameters. For each two-dimensional image, a mathematical index, such as image energy, is produced related to the image quality of the two-dimensional image. Finally, the functional relationship between the mathematical index and the parameters is established so as to allow rapid evaluation of the affect of a change in parameter on image quality.

Thus it is one object of the invention to allow automated evaluation of the functional relationship between rendering system parameters and the produced images.

The method may include the step of generating synthetic three-dimensional image data, and the mathematical index may be generated by comparing each two-dimensional image to an optimized image. The optimized image may be generated using parameters determined with the synthetic three-dimensional image data.

Thus it is another objection of the invention to provide a quantitative benchmark of image quality for actual clinical images. By developing an optimized set of parameters using a simplified test data set, those same parameters may be applied to complex clinical data to produce a benchmark image against which other images may be compared.

The synthetic three-dimensional image data may be constructed to have no overlapping data elements in projections to the two-dimensional images.

Thus it is another object of the invention to provide for a test image data set that will provide high correlation between image energy and image quality allowing for automated image evaluation.

The parameters may be operation settings of the rendering engine including interpolation type, projection angle, sampling distance, ray density, aspect ratio or window size, or may be different rendering engines altogether.

Thus, it is yet another object of the invention to provide a method of evaluating not only the settings of rendering engines, but the particular rendering engine type as well. Such a system may allow selection of rendering engines that are particularly appropriate for different types of imaging modality.

The method may include the additional steps of producing, for each two-dimensional image, a time-cost value related to the selected parameters and indicating the time required to generate the image. A functional relationship may be fit to the time-cost values so as to allow rapid evaluation of the affect of a change in parameter on time-cost.

Thus it is another object of the invention to allow image quality to not only be compared against the imaging parameters, but also against processing time needed to produce images with those parameters.

The foregoing and other objects and advantages of the invention will appear from the following description. In the description, reference is made to the accompanying drawings which form a part hereof and in which there is shown, by way of illustration, a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
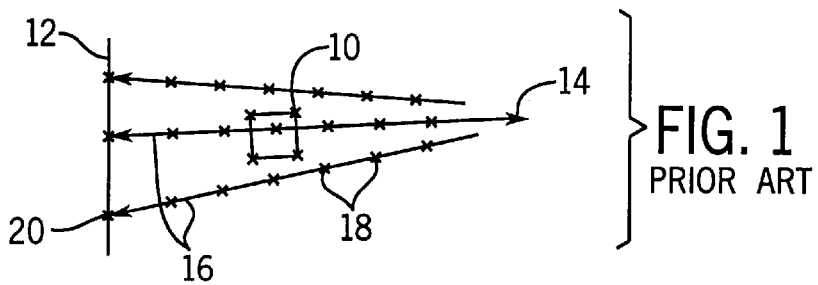
FIG. 1 is a simplified depiction of the process of projecting three-dimensional data on to a two-dimensional imaging plane showing two operation settings of a ray casting rendering engine such as sampling resolution and ray density, that may be optimized in the present invention.

Referring now to FIG. 1, the process of projecting three-dimensional image data 10 to a two-dimensional image 12 may be done by a number of well known image rendering techniques. Each technique employs a rendering algorithm, such as ray tracing, subject to a number of operational settings, such as sampling rate. The selection of the rendering algorithm and the operation setting will henceforth be collectively termed "imaging parameters".

In a ray tracing algorithm, for example, a viewpoint 14 is established with respect to the three-dimensional image data 10 and a number of rays 16 are cast from that viewpoint 14 and sample points 18 along those rays 16 are taken at which points the value of the three-dimensional image data 10 is determined. The three-dimensional image data 10 consists of a plurality of image voxel having brightness values linked to three-dimensional Cartesian coordinate. Typically, the sample points 18 will not coincide exactly with sample points of three-dimensional image data 10, and so one of a number of types of interpretation will be used.

Once the value of sample points 18 on the rays 16 have been determined, the brightest, closest or average of the sample points 18 along each ray 16 are collected to produce image pixels 20 forming the two-dimensional image 12.

Generally fewer rays 16, fewer sample points 18, simpler forms of interpolation and of combining the sample points along the rays 16, will all produce faster images. On the other hand, these same reductions may also cause distortion in the resulting two-dimensional image 12. In particular, lower ray numbers and sampling can cause voxels to be missed by rays 16 and sample points 18.

Other operation settings of the rendering technique that may affect the quality of the image produced are the projection angle determined from the selection of the viewpoint 14, and the window size, being the total angular dispersion of the rays 16. The aspect ratio of the three dimensional image data 10 (i.e., the spacing proportion of the voxels in the three-dimensions), will also affect the two-dimensional image 12.

Figure 2:
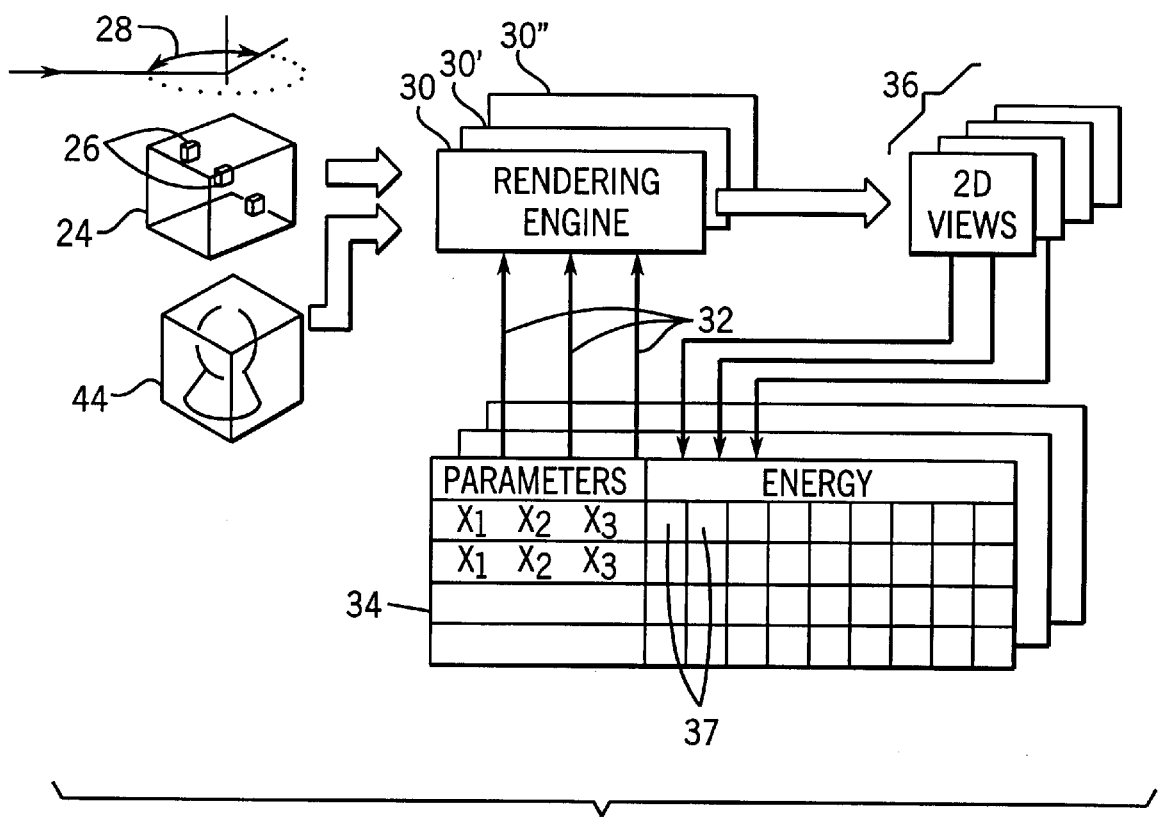
FIG. 2 is a schematic representation of the operation of the present invention receiving a synthetic three-dimensional data set and clinical three-dimensional data set and using different operation settings and/or different rendering engines to generate two-dimensional views that may be evaluated as to image quality.
Figure 6:
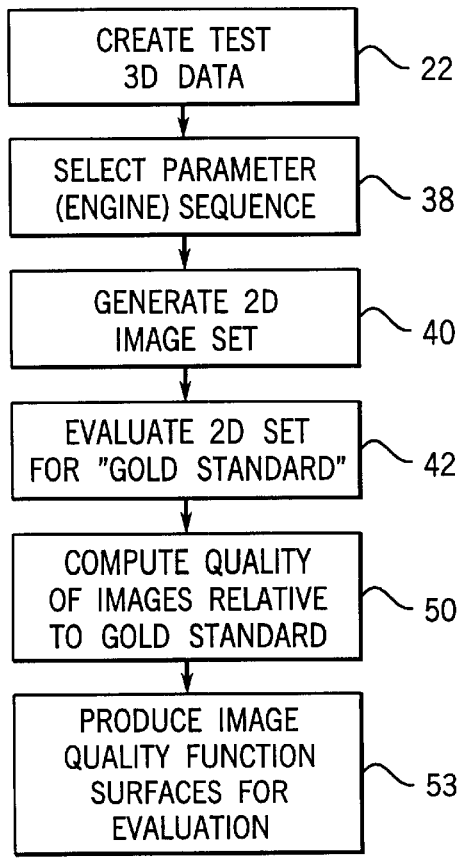
FIG. 6 is a flow chart showing the steps of the present invention in evaluating rendering system parameters.

Referring now to FIGS. 2 and 6 in a first step of the present invention, indicated by process block 22, synthetic three-dimensional data 24 is generated as shown in FIG. 2. This data may be a phantom scanned by the image modality of interest or computer generated phantom. In either case the synthetic three-dimensional data 24 is created so as to stress or test the three-dimensional rendering algorithm and its operation settings that affect image quality.

Generally the total volume of the synthetic three-dimensional data 24 will be commensurate with the typical volume acquired by the image modality and will have an aspect ratio mirroring the aspect ratio of the voxels of the acquired clinical data using that modality. In the preferred embodiment, the synthetic three-dimensional data 24 provides a set of non-overlapping regions 26 arranged along a diagonal line of a rectangular prism of data. The regions 26 may be placed in semi-random fashion along the diagonal line. By non-overlapping it is meant that the regions 26 are arranged so as to be non-overlapping in two-dimensional images acquired at any projection angles 28 about a central vertical axis. In the preferred embodiment, each region 26 of the synthetic three-dimensional data 24 is a single voxel with a value magnitude of "one" while all other volumes of the synthetic three-dimensional data 24 outside the regions 26 have a value of "zero".

By making these regions 26 non-overlapping, a measurement of image energy provides an indication of image quality. Image energy is the sum of the magnitude of the values of all pixels in the two-dimensional image 12. For this synthetic three dimensional image data 24, the image energy of a high fidelity two-dimensional image 12 will be equal to the sum of all voxels in the synthetic three-dimensional data 24. This equivalency holds because regions 26 do not occlude each other at different angles.

Once the synthetic three-dimensional data 24 has been generated, it is provided to one of a number rendering engines 30 to be tested, such as a ray casting engine. The engines use a predetermined rendering algorithm and receive operation settings 32, such as ray density and sample spacing as have been described, and which control the settings of the rendering engine. The particular operation settings (together with the selection of the rendering engine 30) may be obtained from a parameter table 34 and may for example reflect a random selection of parameters or parameters of a particular experiment selected according to the statistical Design of Experiment technique well known in the art and intending to create combinations which will provide extreme examples of image quality. Because it will not always be clear which parameters will have the most important effect on the image, the present invention selects a generous number of parameters that may affect final two-dimensional image 12.

Each set of parameters forms one row of the parameter table 34, which will be used by the rendering engine 30 to develop a sequence of evaluating two-dimensional images 36 each taken at different projection angles 28 about the synthetic three-dimensional data 24. Referring to FIG. 6, the selection of the parameter sequence is shown by process block 38 while the generation of the evaluation images 36 is shown by process blocks 40.

The image energy for each image 36 is stored as one cell 37 in the corresponding row of the table 34. Upon completion of filling of the cells 37 for the row of the table 34, a new set of parameters is provided to the rendering engine 30 and the process is repeated for new evaluation two-dimensional image 36. As noted above, in addition to varying the operations settings, the parameters may select different rendering engines 30' and 30" may be employed each getting a different row entry end table 34.

Figure 3:
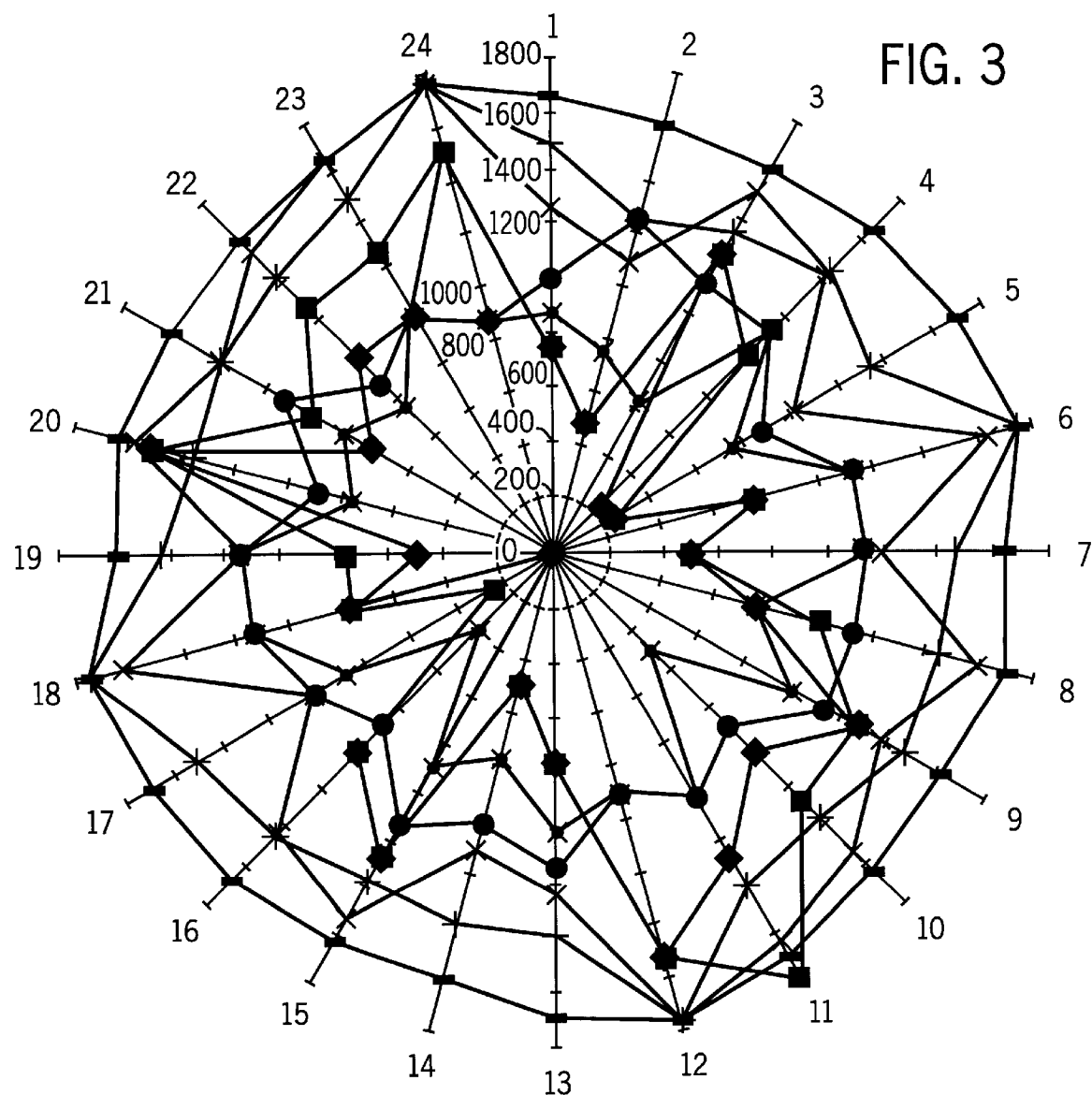
FIG. 3 is a graph using polar coordinates and showing image energy for different two-dimensional images taken at different angles of projection and with different sets of operation parameters per the system of FIG. 2, with the graph showing both the relative magnitude and variance in the energy measurements.

Referring now to FIG. 3, image energy measurements for twenty four different angles about the synthetic three-dimensional data 24 were taken for eight different series having a different parameter and plotted as a function of the angle. As can be seen, series one provides both the greatest image energy and the most constant image energy value for different angles. The parameters for this series are designated as the "gold standard" parameters as indicated by process block 42 of FIG. 6.

Figure 4:
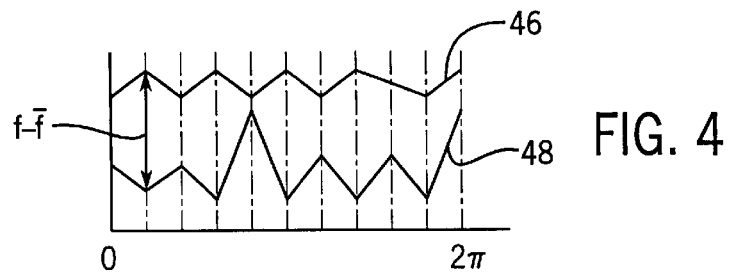
FIG. 4 is a graph on Cartesian coordinates of two of the graph lines of FIG. 3, one representing a "gold standard" of parameters and the other representing an image acquired with different parameters to be compared to the "gold standard" image, the graph indicating the values used in the development of an RMS measure of error.

Referring again to FIG. 2, a clinical data set 44 is next provided to the rendering engine 30, and using both the parameters 32 of the gold standard and different parameters 32, two evaluation sets of two-dimensional images 36 are developed. Referring now to FIG. 4, a Cartesian plot of the resulting two images sets of shows pictorially values of the gold standard images 46 compared to corresponding values of images 48 made with a given set of parameters other than the gold standard parameters.

As each new curve 48 is acquired, the variation between it and the gold standard (f–f̄) at the same angle is determined. For each series, e.g., row of table 34, an RMS error value may be determined as follows.

$$\text{RMS}_{error} = \frac{\|f - \bar{f}\|}{\|f\|} * 100 \quad (1)$$

wherein f is the gold standard image 46 and f̄ the new image 48 representing the two-dimensional image being compared to the gold standard at the same angle and the vertical lines are the modulus operator as follows:

$$|x| = \sqrt{\sum_{i=0}^{N-1} (X_i)^2} \quad (2)$$

These comparison processes are indicated by process block 50.

Figure 5:
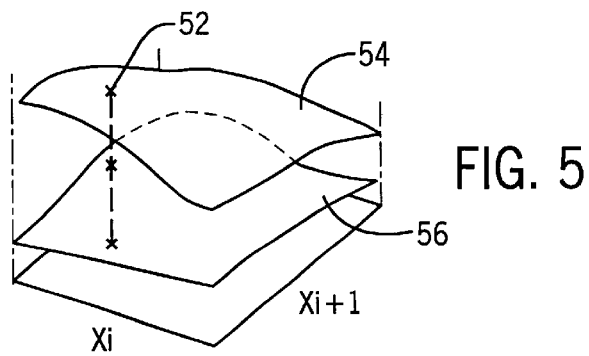
FIG. 5 is a perspective view of a three-dimensional plot showing an RMS error surface and a time-cost surface fit to two parameters $X_i$ and $X_{i+1}$ as may allow rapid determination of optimal rendering engine selections.

Referring now to FIG. 5, a row of the table 34 may include N different parameters 32 including selection of a rendering engine and its operation settings. These parameters together with their RMS values of the image series 32 define an N+1 dimensional space shown for only two dimensions (for parameters $x_i$ and $x_{i+1}$) in FIG. 5 for clarity. Each RMS value thus provides a point 52 on the surface defining a functional relationship between the parameters 32 and image quality. When all the rows of table 34 have been completed, a number of points 52 exist and a surface may be fit to them for example by a least squares technique or other regression type methods. The process of establishing this surface is indicated generally by process block 53 of FIG. 6.

This surface 54 may be used to rapidly evaluate potential changes in the parameters x. In the simplest use of this surface 54 the parameters providing the greatest image quality may be selected by moving to the highest point on the surface. This generally will not be the parameters defining the gold standard as a result of the effect of the image data subject on the image quality.

In an alternative embodiment, a time-cost surface 56 may also be generated associating each of the parameter sets with a time required for the rendering engine to complete the two-dimensional images 12 as may be measured during the rendering process. This time-cost surface 56 may then be used in conjunction with the image quality surface 54 to select trade offs between time-cost and image quality. For example if cinematographic displays are required where the time-cost must be low, lower image quality may be accepted.

The selection of imaging parameters may be performed automatically by placing threshold limits on the time-cost surface and examining only the image quality surface within the boundaries of that threshold at time-cost surface 56.

The method described above was validated by comparing the RMS value or the standard deviation values to values determined subjectively by human observers and a high correlation was obtained, thus validating the sense that the method provides a quantitative substitute for subjection image quality determinations.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

I claim:

1. A method for evaluating a three-dimensional rendering system employing a rendering engine having predetermined operating settings, the method comprising the steps of:
   (a) collecting three-dimensional image data;
   (b) identifying a set of parameters affecting an image quality of two dimensional images produced by the rendering system;
   (c) generating a set of two-dimensional images using the rendering system operating on the three-dimensional image data using different parameters of the set of parameters;
   (d) producing for each two-dimensional image a mathematical index related to the image quality of the two-dimensional image; and
   (e) fitting a functional relationship to the mathematical index and the parameters so as to allow rapid evaluation of the affect of a change in parameter on image quality;
   (f) generating synthetic three-dimensional image data; and wherein step (d) generates the mathematical index by comparing each two-dimensional image to an optimized two-dimensional image of the three-dimensional image data generated by using parameters obtained from evaluation of the synthetic three-dimensional image data.

2. The method of claim 1 wherein the mathematical index is the root mean square of the-difference between each two-dimensional image and the corresponding optimized two-dimensional image.

3. The method of claim 1 wherein the optimized parameters are those providing images of the synthetic three-dimensional image data having the greatest image energy in the test images.

4. The method of claim 1 wherein the parameters obtained from evaluation of synthetic three-dimensional image data are those providing test images of the synthetic three-dimensional image data having least variation in image energy between the test images.

5. The method of claim 1 wherein the synthetic three-dimensional image data is constructed to have no overlapping data elements in projections to the two-dimensional images.

6. The method of claim 1 wherein the parameters are operation settings of a rendering engine.

7. The method of claim 5 wherein the parameters are selected from the group consisting of: interpolation type, projection angle, sampling distance, ray density, aspect ratio of data, and window size.

8. The method of claim 1 wherein the parameters are different rendering engines.

9. The method of claim 1 wherein at step (c) the generated two-dimensional images include images at different projection angles for each different parameter of the set of parameters.

10. A method for evaluating a three-dimensional rendering system employing a rendering engine having predetermined operating settings, the method comprising the steps of:

(a) collecting three-dimensional image data;

(b) identifying a set of parameters affecting an image quality of two dimensional images produced by the rendering system;

(c) generating a set of two-dimensional images using the rendering system operating on the three-dimensional image data using different parameters of the set of parameters;

(d) producing for each two-dimensional image a mathematical index related to the image quality of the two-dimensional image; and (e) fitting a functional relationship to the mathematical index and the parameters so as to allow rapid evaluation of the affect of a change in parameter on image quality;

(f) producing for each two-dimensional image, a time-cost value related to its parameters and indicating the time required to generate the image; and (g) fitting a functional relationship to the time-cost values so as to allow rapid evaluation of the affect of a change in parameter on time-cost.

11. The method of claim 2, wherein the synthetic three-dimensional image data includes at least one of data that is artificially generated by a computer and data concerning a real object.

* * * * *